(12) United States Patent
Kuderer

(10) Patent No.: US 6,300,613 B1
(45) Date of Patent: Oct. 9, 2001

(54) PHOTODIODE ARRAY WITH EXPANDED DYNAMIC RANGE

(75) Inventor: Hubert Kuderer, Waldbronn (DE)

(73) Assignee: Agilent Technologies, Inc., Loveland, CO (US)

( * ) Notice: Subject to any disclaimer, the term of this patent is extended or adjusted under 35 U.S.C. 154(b) by 0 days.

(21) Appl. No.: 09/315,571

(22) Filed: May 20, 1999

(30) Foreign Application Priority Data

Jun. 26, 1998 (EP) .................................................. 98111835

(51) Int. Cl.$^7$ ....................................................... G01J 1/42
(52) U.S. Cl. .................. 250/208.2; 356/328; 250/214 R
(58) Field of Search ............................ 250/208.2, 208.1, 250/214 C, 214 R, 214 DC, 214 LA; 356/328, 326, 221–223

(56) References Cited

U.S. PATENT DOCUMENTS 5,303,027 * 4/1994 Kuderer et al. ...................... 356/328

FOREIGN PATENT DOCUMENTS

519105A1    6/1991   (EP) .

OTHER PUBLICATIONS

European Search Report, EP 98 11 1835, Nov. 23, 1998.

* cited by examiner

*Primary Examiner*—Que T. Le
*Assistant Examiner*—Thanh X. Luu

(57) ABSTRACT

A charge balance type of photodiode array uses parallel A/D conversion in each channel of the photodiode array. The charge caused by the photocurrent of a photodiode in each channel is removed in predetermined charge packets provided by a dumping circuit and the binary encoded number of delivered charge packets corresponds to the actual photocurrent. Charge balance photodiode arrays have a wide variety of applications. It is therefore useful to adapt photodiode arrays to the specific requirements of an individual application. The intention therefore provides a photodiode array having at least one switching circuit to vary signal processing parameters such as a gain factor g or an attenuation factor k. This improvement facilitates a multifunctional photodiode array for a plurality of different applications.

14 Claims, 4 Drawing Sheets

PHOTODIODE ARRAY WITH EXPANDED DYNAMIC RANGE

BACKGROUND OF THE INVENTION

The invention concerns a photodiode array in accordance with the precharacterizing part of claim 1. Such a photodiode array is used, for example, for measuring the absorption spectrum of a sample substance to derive information concerning the chemical composition of the sample and the quantities of individual constituents in the sample.

A photodiode array of this kind is known in the art through European patent EP 0 519 105 B1. This conventional photodiode array can be used in a liquid chromatograph for analyzing the substances eluting from the chromatographic column. It comprises a light source emitting a broad spectrum of ultraviolet and visible radiation and an optical system for focussing the beam onto a sample cell through which the sample substances to be analyzed flow. Depending on the specific substances flowing through the cell, the sample absorbs certain characteristic spectral portions of the radiation entering the sample cell so that the spectral composition of the radiation leaving the cell is indicative of the sample substances.

In such a spectrometer, the spectrum of the radiation leaving the sample cell is extracted using a diffraction grating disposed in the optical path behind the cell. The diffraction grating directs light rays of differing wavelengths into different directions. A linear photodiode array is disposed to receive the light diffracted by the grating. Each diode thereby receives light corresponding to a different wavelength range. The electrical signals produced in each photodiode by the impinging light are read out by a read-out circuit and converted to digital data values representative of the intensity of the light incident on the respective diode. These data values are then displayed as a function of wavelength in any convenient form, for example on a CRT screen.

The photodiode array is a semiconductor device and comprises a plurality of photosensitive elements connected via electronic switches to a common output line, e.g. a video line, which in turn is connected to a charge amplifier. Each photosensitive element has an associated capacitor representing the junction capacitance of the photodiodes. The combination of a photosensitive element and associated capacitor is also referred to as a "photocell".

Light impinging on the photosensitive material generates charge carriers discharging these capacitors. The capacitors of the photocells are initially charged to a predetermined value and are discharged by the photocurrent generated by the photocells when light impinges thereon. The amount of charge needed to recharge the capacitors to their original values causes a voltage change at the output of the charge amplifier-a signal indicating the light intensity on the photodiode.

A photodiode array comprises a plurality of photocells, each generating these output signals, which are processed sequentially. The photodiode array usually operates in an integrating mode (self-scanning and random access photodiode arrays). The distribution of the output signals over time is associated with the problem of spectral distortion. In particular, for spectrophotometers used to detect sample substances eluting from the column of a liquid chromatograph, the sample to be analyzed changes as a function of time. Since the signals from the individual photocells are processed sequentially, the output signals caused by light beams of different wavelengths simultaneously impinging on the photodiodes are therefore evaluated in a time distributed fashion.

Another problem is that a single A/D converter is normally used to sequentially convert the signals from individual photodiodes of the photodiode array. Since the number of photodiodes is usually very large, i.e. 1024 photodiodes, the conversion rate of the A/D converter has to be very high, e.g. above 100 kHz, to ensure high measuring accuracy. Such A/D-converters are rather complex and expensive.

A parallel photodiode array architecture is therefore preferred in accordance with EP 0 519 105. The signals from each channel, having its own converter, are simultaneously generated. Simpler A/D converters can be used for each channel and the measuring accuracy of time variable sample concentrations is improved.

The use of a charge balance type of photodiode array is preferred to improve integration of the photodiode array, e.g. onto one single silicon chip. This type of photodiode array uses an integrator circuit to accumulate the charge delivered by the photocurrent and removes the charge accumulated within a predetermined time interval in defined charge packets using a switchable dumping capacitor. The frequency of charge dumps required to keep the system in balance is proportional to the photocurrent generated by the individual photodiode. Each photodiode is connected to the summing node of an integrator which continuously accumulates the charge corresponding to the photocurrent for effecting the A/D conversion. The output signal of the integrator is periodically compared to a predetermined signal level, i.e. by a suitable comparator and, in response to these comparisons, charge dumps to and/or from the integrator are executed to keep the output signal near a predetermined level. The number of such dumps is counted, i.e. by a logical counter during a predetermined time interval. The number determined is a digital signal representing the actual photocurrent.

In a preferred embodiment of this conventional photodiode array, a current mirror, i.e. a "Wilson current mirror", is used to amplify and to reverse the photocurrent. This embodiment is useful since the photocurrent varies for different applications and light intensities. The current mirror is inserted into the photocurrent path between the photocell and the summing node of the integrator circuit to decouple the junction capacitance of the photocell from the summing node.

The above described type of photodiode array is used in a plurality of different applications. Photodiode arrays of this kind are used

- with analytic equipment such as spectrophotometers or diode array-detectors,
- for color—or thin film measurement using light reflection, light transmission or light emission,
- in image scanning devices,
- in control devices for different industrial processes.

These different applications are associated with widely differing requirements with regard to the needed scanning rate, the time and/or signal resolution, the signal to noise ratio, and the dynamic sensitivity of the photodiode array.

Due to the extremely high research and development costs for the above described photodiode arrays it is useful to create a photodiode array suitable for nearly all applications.

SUMMARY OF THE INVENTION

It is therefore the primary object of the invention to expand the range of application of a photodiode of the charge balance type. It is also an object of the invention to expand the dynamic measuring range of the photodiode to facilitate adaptation to an expanded scope of differing light intensities impinging on the photodiodes of the photodiode array.

This object is achieved with a photodiode array of the type categorized by the features of the precharacterizing part of claim 1 in a photodiode array having the characterizing features thereof.

The basic principle of the invention is the creation of a photodiode array of the charge balance type which is adaptable to a plurality of different applications. The photodiode array therefore has a switching circuit to vary at least one of the system-specific parameters associated with the measuring data delivered by the photodiode array. The switching circuit allows variation of, for example, the time resolution, the signal resolution or the measuring sensitivity of the photodiode array.

The user-friendliness of the photodiode array is increased when the switching circuit is programmable. Macros can be defined to accommodate the requirements of frequently used applications.

It is also an object of the invention to arrange the improved photodiode array on a single semiconductor-chip. It is therefor useful to effect the switching circuit and the other parts of the photodiode array using CMOS technology.

In a preferred embodiment of the invention, an interval control circuit is inserted to vary the length of the time interval for accumulating the charge delivered by the photocurrent. Increasing the time interval results in an increased number of counted charge dumps to improve the signal resolution at the expense of the time resolution.

In an further improvement in this embodiment, the interval control circuit comprises a logic circuit having a shift register to determine the length of the time interval.

In accordance with claim 6, a controllable attenuation is effected by a switchable dumping circuit. This dumping circuit comprises at least two switchable dumping circuits, wherein the size of the charge dumps is defined in dependence on the chosen capacitor wiring. The attenuation can thereby be adapted to the requirements in dependence on the expected maximum photocurrent. An adjustable attenuation expands the range of photocurrent values and consequently of differing light intensities which can be measured.

In an further improved embodiment of the invention, amplification of the photocurrent is controllable using a controllable current amplifier. This embodiment has the advantage of amplifying weak photocurrent signals and attenuating strong ones to expand the range of application of the photodiode array.

In a further improvement in this embodiment, the current amplifier is effected using CMOS-technology to facilitate arrangement of the entire photodiode array on one single chip. It is thereby advantageous to effect the current amplifier in a multistage manner to strongly reduce the amount of space needed on the chip substrate for a given gain-factor compared to a single current amplifier stage having this gain factor, since the stages of a multistage amplifier are much more compact.

One embodiment of a controllable current amplifier comprises suitable additional FETS, switchable for insertion or for turn-off. Inclusion of additional FETS in parallel increases the effective channel width and insertion of additional FETS in series increases the effective channel length of the current amplifier.

The stages of the current amplifier are connected as characterized in claim 10 to avoid flicker noise voltages caused by switching of these additional FETS.

Finally, at least two controllable current amplifiers are connected in parallel to effect one current amplifier stage, wherein the sum of their output currents is the input current for the next amplification stage.

In accordance with claim 12, some or all of the above mentioned switching circuits can be combined in one single photodiode array to provide maximum adaptivity for this photodiode array. A multifunctional photodiode array suitable for a wide range of different applications is therefore created.

BRIEF DESCRIPTION OF THE DRAWING

An embodiment of the invention is described in more detail below with reference to the drawings.

DESCRIPTION OF THE PREFERRED EMBODIMENT

Figure 1:
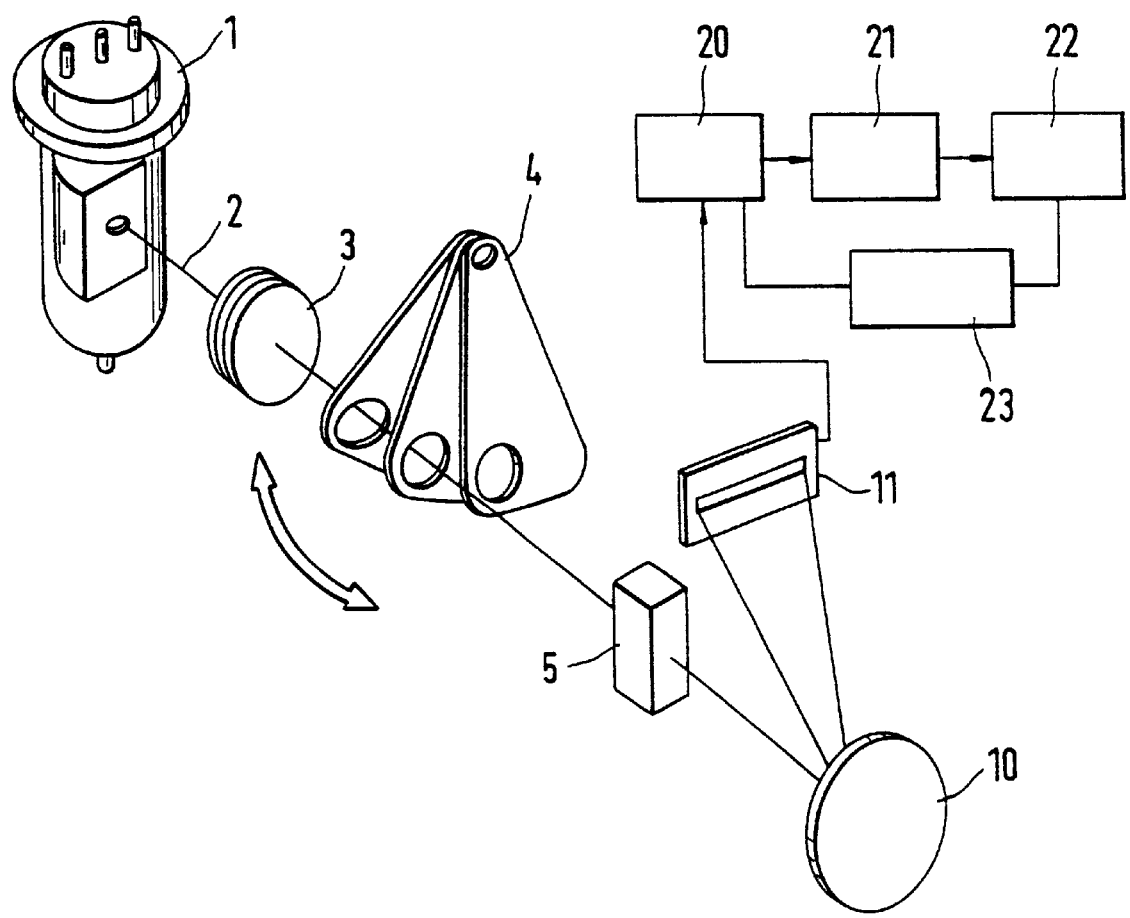
FIG. 1 shows a schematic diagram of a photodiode array spectrometer comprising a photodiode array according to the invention.

FIG. 1 schematically shows a photodiode array for measurement of the absorption of a polychromatic beam of ultraviolet and/or visible radiation by a sample to be analyzed.

The spectrometer comprises a light source 1 e.g. a deuterium lamp which emits a light beam 2 of polychromatic radiation. In accordance with the invention, the light source 1 may also be a flash light type lamp. The light beam 2 is focused by a lens system 3 into a sample cell 5. The lens system 3 is preferably an achromatic system to ensure that rays of different wavelengths have substantially the same focal point. A shutter 4 permits interruption of the light beam 2 for measuring the dark signal at the photodiodes of the photodiode array 11. During the actual measuring process with the beam 2 passing through sample cell 5, the dark signal and other offset signals are subtracted from the measured values to compensate measuring errors.

The sample cell 5 may comprise an inlet and an outlet through which a sample liquid to be analyzed continuously flows. A spectrometer of this kind is used in liquid chromatographs connected to a chromatographic separation column from which sample substances are continuously eluting.

The polychromatic radiation entering the sample cell 5 is partially absorbed by the substance in the cell. Depending on the sample substances, rays of certain wavelengths are more strongly absorbed than rays of other wavelengths. The beam leaving the cell 5 therefore has a different spectral composition than the light beam 2 entering the cell 5. The resulting spectrum thereby contains information about the type and quantity of substances in the cell 5.

The beam leaving the cell 5 impinges on a holographic diffraction grating 10, which disperses the light in dependence on the different wavelengths in the incident beam. The spatially separated light rays from the grating 10 impinge on a photodiode array 11 consisting of a plurality of individual light sensitive diodes separated by light insensitive gaps. Each of the photodiodes captures a specific spectral portion of the diffracted radiation.

The photodiode array 11 is connected to a read out circuit 20 for continuously reading out electrical signals from the photodiodes, these signals being indicative of the intensity of the light signals impinging on the photodiodes. The electrical signals read out from the photodiode array 11 are then further processed in a signal processing unit 21. Operation of the read out circuit 20 and the signal processing unit 21 is controlled by a controller 23 which also controls display means 22 for displaying a spectrum of the analyzed sample.

Figure 2:
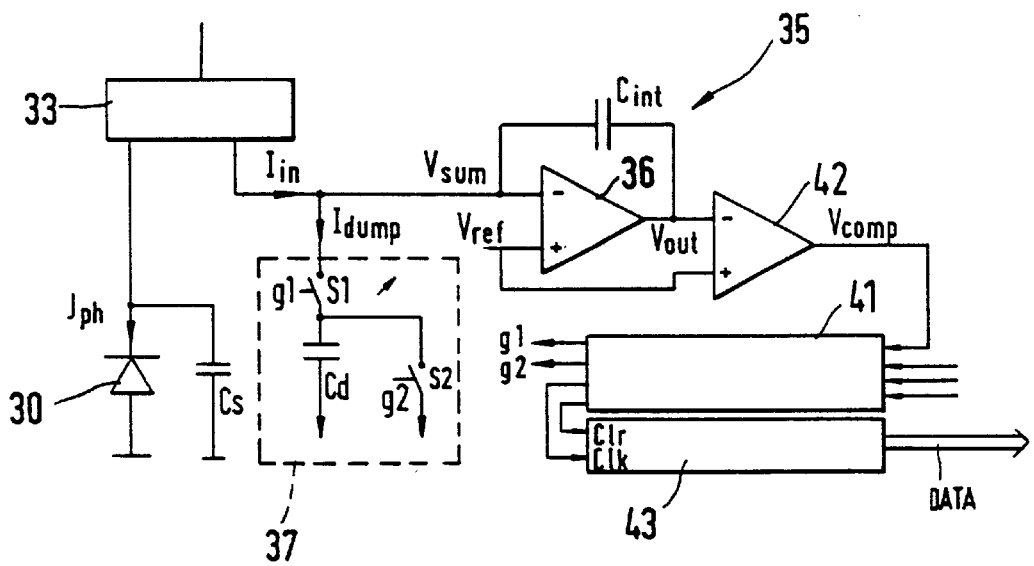
FIG. 2 shows a block diagram illustrating one channel of a charge balance type photodiode array having a current mirror.

As shown in FIG. 2, a photodiode 30 is reverse biased and acts as a current source. Each photodiode 30 has an associated capacitor $C_s$ representing the junction capacitance of the photodiodes 30. A photocurrent $I_{ph}$ flows when light impinges on the photodiodes and has a value proportional to the incident light level. The photodiode 30 is connected via a current mirror 33 to a summing node of an integrator circuit 35 comprising an operational amplifier 36 and a capacitor $C_{int}$ in its feedback loop. A dumping circuit 37 comprises a switchable dumping capacitor $C_d$ controlled by a logic circuit 41. A comparator circuit 42 is connected between the output of the integrator circuit 35 and the logic circuit 41. The charge dumps of the dumping capacitor $C_d$ needed to keep the system in balance are counted by a digital counter 43. The digital output signal of the counter 43 indicates the light intensity impinging on the photodiode 30. The above described type of photodiode array 11 is called a "charge balance type".

The current mirror 33 is preferably a conventional Wilson current mirror described in detail in EP 0 519 105 B1. Other current mirror circuits could also be used in accordance with the invention.

The embodiment of the invention described below comprises at least one switchable circuit to vary parameters associated with the digital output signal of the photodiode array. The digital output signal is a binary encoded number of delivered charge dumps representing the actual photocurrent. The digital output signal is also a dimensionless quantity given by the following equation:

$$\text{output signal} = \frac{I_{ph} * t_{int} * k}{V_{ref} * C_d * g}$$

with,
$V_{ref}$=voltage level at the non-inverting side of the integrator circuit (35)
$I_{ph}$=photocurrent
$t_{int}$=time interval
$C_d$=dumping capacitor
k=attenuation factor
g=amplification factor and, $$Q_d = V_{ref} * C_d$$

with,
$Q_d$=delivered charge packets
and $$I_{ph} * t_{int} = n * Q_d * 1/k * g$$

The time resolution of the recorded output signal depends on the length of the time interval $t_{int}$. The signal resolution depends on various parameters, in particular on the number of delivered charge dumps $Q_d$ in a given time interval $t_{int}$ for fixed system parameters. The dynamic measuring range depends on the ratio of a maximum countable number associated with the maximum operable photocurrent $I_{ph}$ to the counted number associated with the minimum operable photocurrent $I_{ph}$.

The maximum operable photocurrent $I_{ph}$ is limited by the size of the charge packets $Q_d$ generated and their frequency, determined by a clock-signal $M_{clk}$.

Fortunately, applications demanding high signal resolution are often satisfied with low signal processing speed and high speed applications rarely also require high time resolution. It can therefore be useful to vary only one of these processing parameters.

Figure 3:
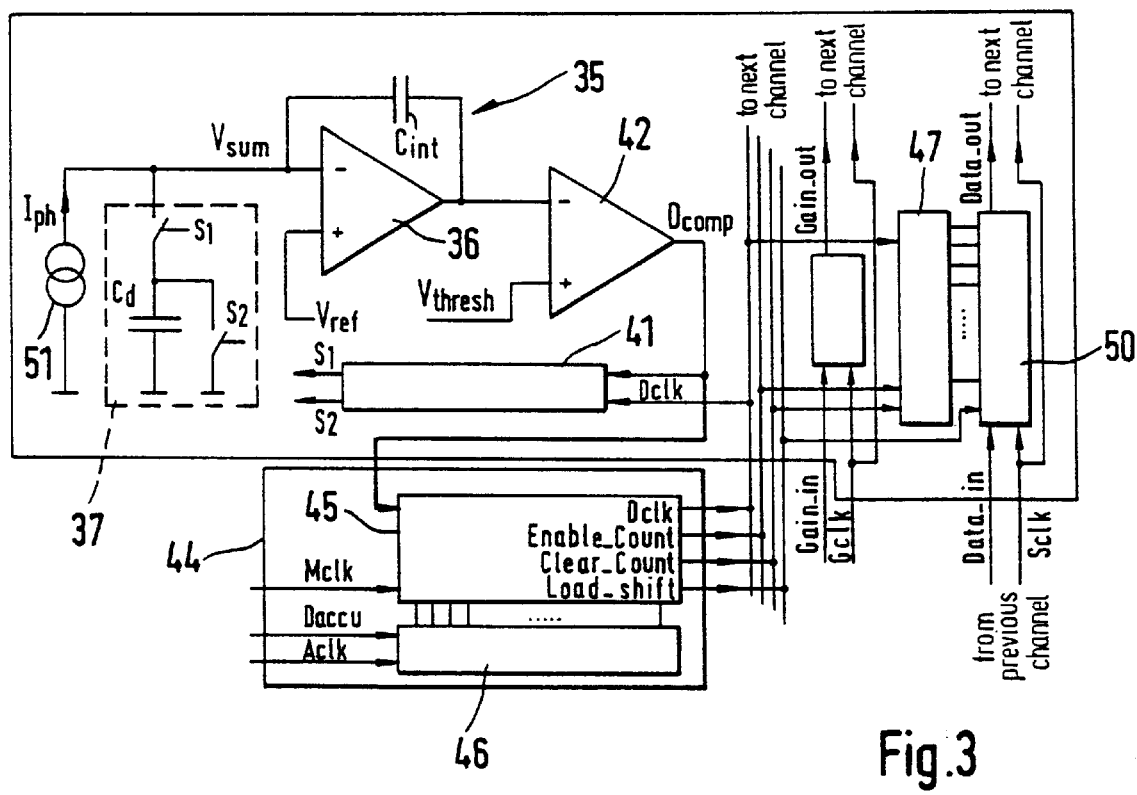
FIG. 3 shows a simplified block diagram of the charge balance type photodiode array with an additional interval control circuit.

FIG. 3 shows the insertion of an interval control circuit 44 comprising an accumulation counter 45 and a shift register 46. The interval control circuit 44 is commonly used by all channels of the photodiode array. The shift register 46 receives input-signals representing a predefined time length of the time interval $t_{int}$. The length of the time interval $t_{int}$ can be predetermined by a program or input manually. The shift register 46 is connected to the accumulation counter 45 receiving the clock signal $M_{clk}$, providing a switching frequency $D_{clk}$ for the logic circuit 41, which controls the dumping circuit 37. A dump counter 47 is connected to an additional shift register 50 to store the counted number of delivered charge dumps, given by the dumping circuit 37 in the time interval $t_{int}$ together with information identifying the particular photodiode 30. The photocell, comprising the capacitor $C_s$ and photodiode 30, is indicated in FIG. 3 as current source 51. The current mirror 33 is not shown here for reasons of clarity.

The interval control circuit 44 permits adjustment of the time interval to provide a suitable time resolution at the expense of signal resolution.

Figure 4:
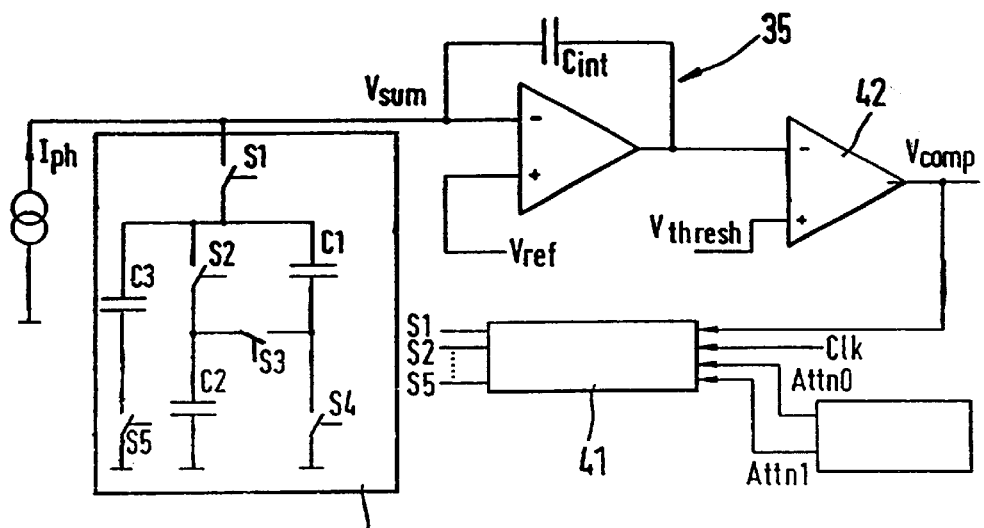
FIG. 4 shows a simplified block diagram of the charge balance type photodiode array with an additional switchable charge dump circuit.
Figure 4A:
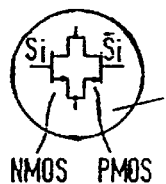

As shown in FIG. 4, a controllable charge dumping circuit 37 is provided to vary the value of the delivered charge dumps by changing the inserted effective capacitance. Towards this end, dumping capacitors $C_1$, $C_2$ and $C_3$ are connected by switch-elements $S_1$, $S_2$, $S_3$, $S_4$ and $S_5$. The different combinations of inserted capacitors provide four different binary weighted values for the effective capacitance with $$C_1 = C_2 = \tfrac{1}{2} C_3.$$

In accordance with the invention, other combinations and/or capacitors can be used for the controllable dumping circuit 37. As seen in the integrated enlarged illustration of switch element $S_5$, the switch elements are also transistor circuits which are program-controlled or controlled by manual input. The attenuation factor k of the photodiode array is also likewise controllable.

As described above, a Wilson current mirror is used to reverse and amplify the photocurrent $I_{ph}$. Inclusion of a circuit enabling a change in the amplification factor g is useful for changing the sensitivity of the photodiode array. A Wilson mirror with three connected MOSFETs M1, M2 and M3 has a current output approximately given by:

$$I_{out} = \frac{L_1 * W_2}{W_1 * L_2} * I_{ph}$$

This equation is based on a simplified transistor model. There is also a need for a suitable gate area to ensure a suitable low flicker noise level. This results in a need for increased space for this gate area and requires as high a ratio $L_1/W_1$ as possible to increase the signal level for improving the signal to noise ratio. This is particularly important with regard to a possible thermal noise contribution. In view of all these requirements, it is advantageous to use a multistage current mirror to amplify the photocurrent $I_{ph}$ as shown in FIG. 5.

Figure 5:
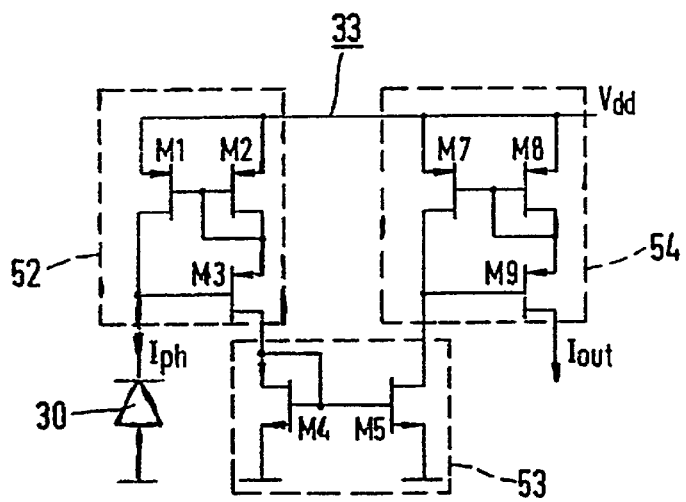
FIG. 5 shows a detail circuit of a charge balance type photodiode array having a multistage current amplifier.

FIG. 5 illustrates a first amplification stage comprising the MOSFETs M1, M2 and M3 complemented by a second amplification stage comprising the MOSFETs M4 and M5 and a third amplification stage comprising the MOSFETs M7, M8, M9 combined into one multistage current amplifier. This current amplifier provides an output current $I_{out}$ corresponding to the input current $I_{ph}$.

Figure 6:
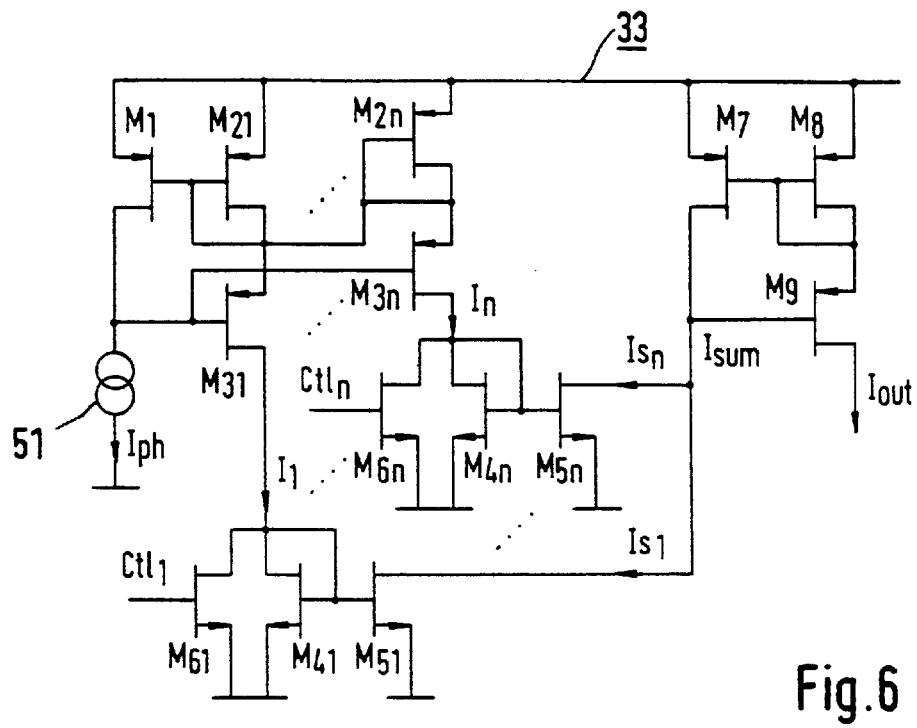
FIG. 6 shows a controllable multistage current amplifier circuit.

In accordance with the invention, it is advantageous to ensure a controllable gain factor g by configuring this multistage current mirror to be controllable. Towards this end, the current amplification circuit is augmented by additional switch-elements $M6_1 \ldots M6_n$, also effected via controlled MOSFETs, as seen in FIG. 6. In this manner, the effective length and or width of each amplification stage of the current mirror can be varied. This controlled changing of the effective current amplification circuit causes a change in the effective gain factor g, as described in the above equation.

The controlled adaptation of the gain factor g by switching the transistor element inside the current mirror circuit described above may cause switching noise which disturbs the signal of the photodiode array. It is therefore advantageous to connect the single stages 52, 53 and 54 of the current mirror in such a manner that the output current $I_1$ is multiplied to and connected in parallel to the drain source terminal of one MOSFET $M4_1$ and the gate source terminal of another MOSFET $M5_1$ of the next second amplification stage, wherein said multiplied output currents $I_1 \ldots I_n$ are controlled by the logic input $Ctl_1 \ldots Ctl_n$ of a switching MOSFETs $M6_1 \ldots M6_n$. The output currents $I_{s1} \ldots I_{sn}$ of the second amplification stage are connected in parallel and summed to a common input current $I_{sum}$ for the third current amplification stage.

Figure 7:
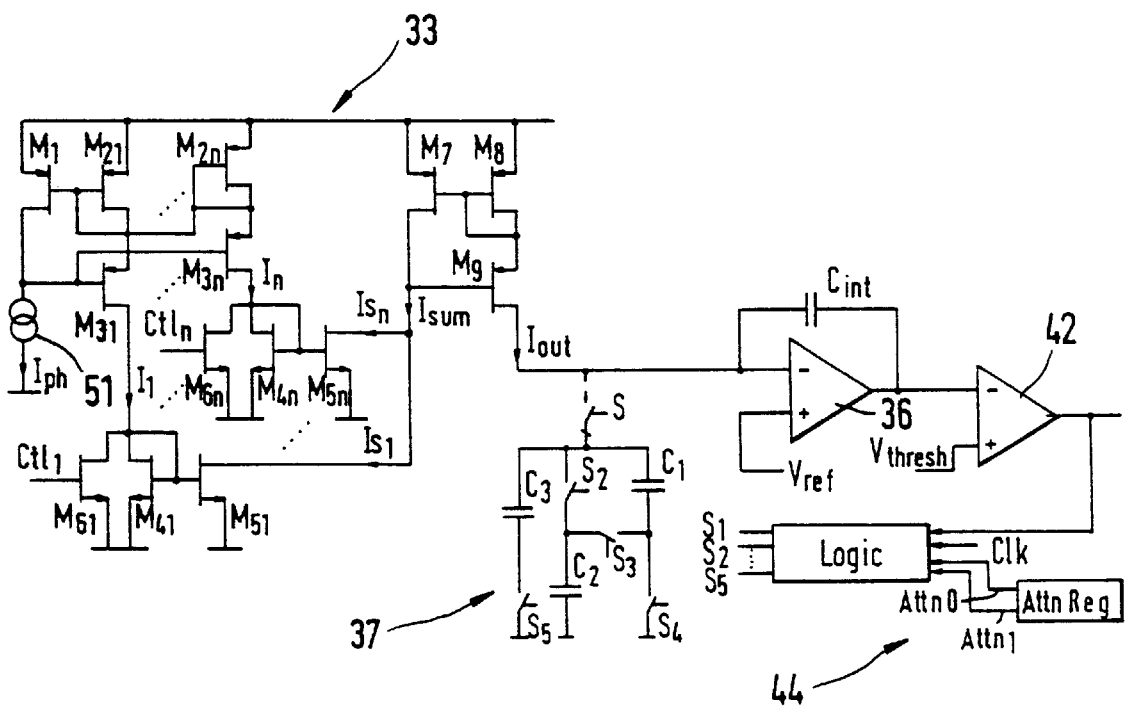
FIG. 7 shows a circuit of a preferred embodiment of a photodiode array with a controllable multistage current amplifier, a controllable dumping circuit and a controllable interval control circuit.

In accordance with the invention, some or all of the above described switching circuits can be combined to vary the signal processing parameters. FIG. 7 shows such a combination of switching circuits with a controllable current mirror 33, a controllable dumping circuit 37 and a controllable interval control circuit 44. The functioning of the individual switching circuits 33, 37 and 44 is described above.

A charge balance photodiode array is disclosed having a variable dynamic measuring range. This preferred type of photodiode array can be used in a plurality of different applications. The number of manufactured units can therefore be increased to thereby reduce production costs per unit.

What is claimed is:

1. A photodiode array having a plurality of channels, each channel comprising:

a photodiode which is reverse biased such that it acts as a current source and which provides an electrical output signal in response to the light impinging on said photodiode, a signal processing unit for processing said electrical output signal of the photodiode, and an A/D conversion circuit for providing a digital output signal indicative of the intensity of light impinging on said photodiode, comprising:

an integrator circuit for accumulating a charge corresponding to said photodiode output signal, said integrator circuit having an output signal corresponding to an accumulated charge;

a controllable dumping circuit, coupled to an input of said integrator circuit, for dumping a number of predefined charge packets to or from said integrator circuit;

a comparator circuit for comparing the output signal of the integrator circuit with a predetermined signal;

a logic circuit, connected to an output of said comparator circuit and to a control input of said dumping circuit for controlling said charge dump packets to keep the output signal of the integrator circuit within a predetermined range about said predetermined signal, and a digital counter for counting the number of charge packets to or from the integrator circuit during a predetermined time interval, wherein said number of charge packets depends on at least one system-specific parameter comprising the time interval for accumulating the charge packets, the value of said charge packets, or the value of said predetermined signal for comparison to the output signal of the integrator circuit, and further wherein, said photodiode array comprises a switching circuit to vary said at least one system-specific parameter for adapting the photodiode array to different applications, wherein said switching circuit comprises in said dumping circuit, a plurality of capacitors selectively connected together by a plurality of switches for programmably varying the effective capacitance of said dumping circuit.

2. Photodiode array as in claim 1, wherein said switching circuit is programmable.

3. Photodiode array as in claim 2, wherein said switching circuit is effected using CMOS-technology.

4. Photodiode array as in claim 1, wherein said switching circuit comprises an interval control circuit having an output signal determining the length of said time interval.

5. Photodiode array as in claim 4, wherein said interval control circuit comprises a controllable shift register to adjust said time interval, and further wherein said dumping circuit comprises a plurality of capacitors selectively connected together by a plurality of switches for providing fixed charge dumps of a fixed frequency to or from said integrator circuit.

6. Photodiode array as in claim 1, wherein said switching circuit comprises a controllable current amplifier, functioning as a current mirror, connected between the photodiode and the integrator circuit.

7. Photodiode array as in claim 6, wherein said current amplifier is effected by CMOS-technology, wherein at least two current amplifier stages are connected in series to provide a multistage current amplifier.

8. Photodiode array as in claim 7, wherein at least one additional FET is switched in parallel or in series with an input of said current amplifier in at least one of said amplifier stages.

9. Photodiode array as in claim 8, wherein said at least two current amplifier stages connected in series comprise a first current amplification stage further comprising an output channel connected in parallel to a drain terminal and a gate terminal of a first FET, and to a gate terminal of a second FET, wherein said first and second FETs comprise a second current amplification stage.

10. Photodiode array as in claim 8, comprising a plurality of multistage current amplifiers connected in parallel, wherein each of said plurality of multistage current amplifiers provides an output current, wherein each of said output currents are summed to form one common input current for at least one additional current amplification stage common to each of said plurality of multistage current amplifiers.

11. The photodiode array of claim 1, wherein said group of system specific parameters further comprises the time interval utilized by said integrator circuit for accumulating said charge.

12. The photodiode array of claim 7, wherein at least one additional FET is switched in parallel or in series with an output of said current amplifier in at least one of said amplifier stages.

13. A photodiode array having a plurality of channels, each channel comprising:
   a photodiode which is reverse biased such that it acts as a current source and which provides an electrical output signal in response to the light impinging on said photodiode;
   a controllable current amplifier, coupled to said photodiode output signal; and
   an A/D conversion circuit for providing a digital output signal indicative of the intensity of light impinging on said photodiode, which comprises:
      an integrator circuit for accumulating a charge corresponding to said photodiode output signal, said integrator circuit having an output signal corresponding to an accumulated charge;
      a controllable dumping circuit, coupled to an input of said integrator circuit, for dumping a number of predefined charge packets to or from said integrator circuit;
      a comparator circuit for comparing the output signal of the integrator circuit with a predetermined signal;
      a logic circuit, connected to an output of said comparator circuit and to a control input of said dumping circuit for controlling said charge dump packets to keep the output signal of the integrator circuit within a predetermined range about said predetermined signal; and
      a digital counter for counting the number of charge packets to or from the integrator circuit during a predetermined time interval,
   wherein said number of charge packets depends on at least one system-specific parameter comprising the time interval for accumulating the charge packets, the value of said charge packets, or the value of said predetermined signal for comparison to the output signal of the integrator circuit,
   and further wherein, said photodiode array comprises a switching circuit to vary said at least one system-specific parameter for adapting the photodiode array to different applications,
   wherein said switching circuit comprises in said controllable current amplifier:
      a first current amplification stage further comprising an output channel connected in parallel to a drain terminal and a gate terminal of a first FET, and to a gate terminal of a second FET, wherein said first and second FETs comprise a second current amplification stage having a second stage output; and
      at least one additional FET switched in parallel or in series with an input of said current amplifier in at least one of said amplifier stages;
      wherein a plurality of said first and second amplification stages are connected in parallel, such that each of said second stage outputs are summed to form a common input current for at least one additional current amplification stage common to each of said plurality of first and second amplification stages.

14. The photodiode array of claim 13 wherein said controllable dumping circuit comprises a plurality of capacitors selectively connected together by a plurality of switches for programmably varying the effective capacitance of said dumping circuit.

* * * * *